No. 760,668. PATENTED MAY 24, 1904.
R. A. B. WALSH.
MACHINE FOR FORMING SHEET GLASS.
APPLICATION FILED FEB. 8, 1904.
NO MODEL.
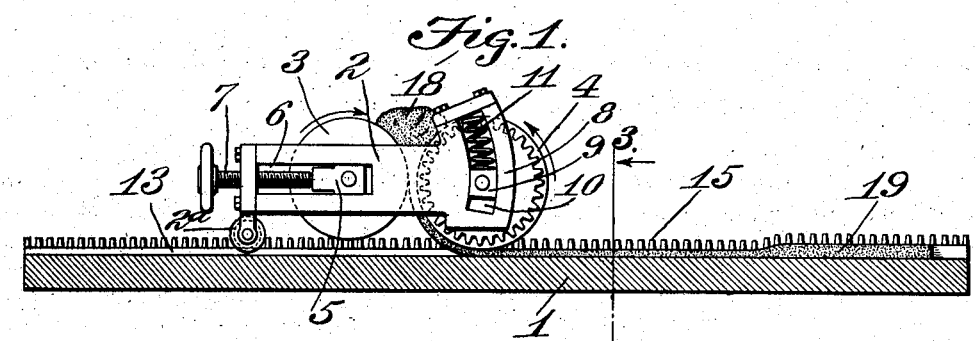
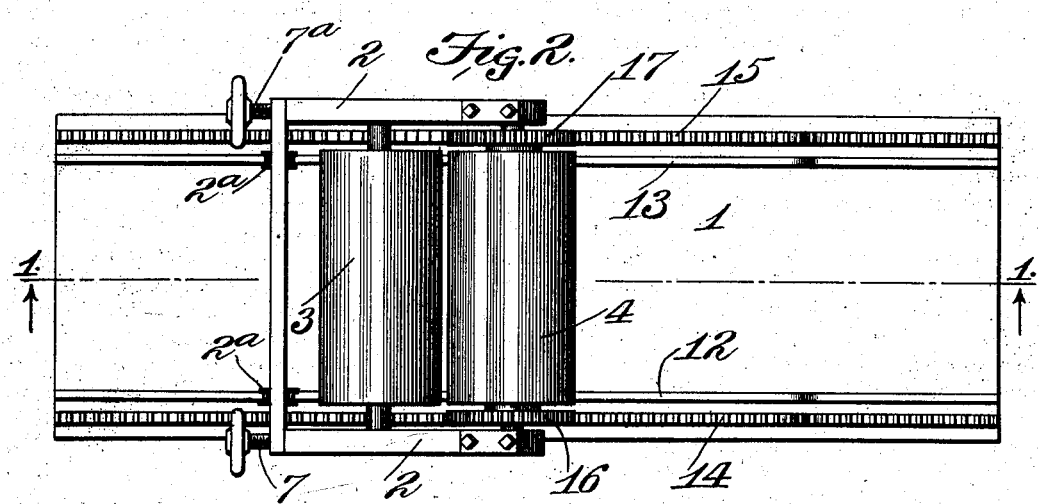
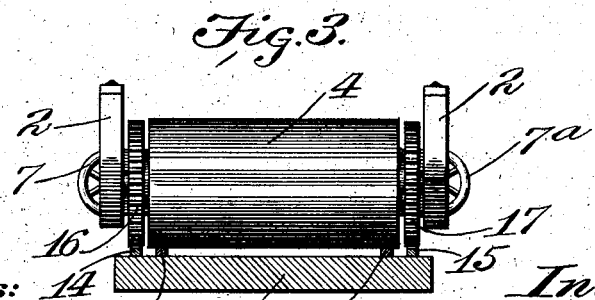
Witnesses:
G. A. Pennington
J. H. Weisbrod
Inventor:
Robert A. B. Walsh,
by Bakewell Cornwall
Attys.

No. 760,668.

Patented May 24, 1904.

UNITED STATES PATENT OFFICE.

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

MACHINE FOR FORMING SHEET-GLASS.

SPECIFICATION forming part of Letters Patent No. 760,668, dated May 24, 1904.

Application filed February 8, 1904. Serial No. 192,508. (No model.)

*To all whom it may concern:*

Be it known that I, ROBERT A. B. WALSH, a citizen of the United States, residing at St. Louis, Missouri, have invented a certain new and useful Improvement in Machines for Forming Sheet-Glass, of which the following is a full, clear, and exact description, such as will enable others skilled in the art to which it appertains to make and use the same, reference being had to the accompanying drawings, forming part of this specification, in which—

Figure 1 is a vertical longitudinal sectional view through a bed or base of a machine constructed in accordance with my invention and on the line 1 1 of Fig. 2, the feed mechanism being illustrated in side elevation. Fig. 2 is a top plan view of the feeding mechanism and the bed or base, and Fig. 3 is a cross-sectional view on the line 3 3 of Fig. 1 looking in the direction indicated by the arrow.

This invention relates to machines for forming sheet-glass; and one of the principal objects thereof is to provide means whereby the plate will be prevented from buckling or ridging during the process of manufacture.

Another object is to provide means whereby the glass will be initially fed upon the bed or base in sufficient quantities to provide anchors, so as to retain the last sheet rigid with relation to its base as it is being formed. The anchor portion may be subsequently severed from the finished sheet.

Another object of the invention is to provide means for regulating the quantity of glass fed upon the bed or base.

Another object of the invention is to provide a yielding pressing means for evenly distributing the glass over the surface of the base.

Other objects and advantages of this invention, as well as the novel details of construction, will be specifically described hereinafter, it being understood that changes in the form, proportion, and minor details of construction may be resorted to without departing from the spirit or sacrificing any of the advantages thereof.

Referring to the drawings, the reference-numeral 1 designates a bed or base upon which the sheet-glass may be formed. The superimposed feed mechanism and the base are relatively movable—that is to say, either has a reciprocal movement with relation to the other; but in the present instance I have illustrated the feed mechanism as being movable, while the base is shown as a stationary one. The frame 2, carrying the feed mechanism, can be of any form suitable for the purpose, and it is guided upon the base by the grooved rollers $2^a$, movable upon the trangs of the bed. In this frame are journaled the rollers 3 and 4. One of the rollers (designated by the numeral 3) is journaled in movable bearings 5, movable in the guide-slots 6 in the frame 2, which bearings may be adjusted by either of the adjusting-screws 7 or $7^a$, whereby the relative distance between the two rollers 3 and 4 can be regulated to govern the amount of glass fed therebetween. Carried by the vertical arm 8 of the frame 2 are sliding bearings 9. Movable in the slots 10 and resiliently mounted therein are the bearings 9, springs 11 bearing against the bearings 9 against one end of each slot. These bearings 9 carry the roller 4, which roller serves a dual purpose—namely, to act as a part of the feed mechanism and also as a presser-roller to evenly distribute the glass over the surface of the bed or base to form the sheet. By reference to Fig. 1 it will be observed that the slots 10 are arcuate, so as to permit the bearings 9 to slide on an arc concentric with the axis of the roller 3, so that when the two rollers are adjusted the upward movement of the roller 4 will in no wise affect the relative distance between the rollers 3 and 4. This is important, inasmuch as a variation of the distance between the rollers would affect the amount of glass fed therebetween onto the bed.

12 and 13 designate the trangs carried on the base and which are of varying depths, one relatively deep portion of each trang being disposed near the end of the base, so that the distance between the top edge of the relatively deep portion of each trang and the upper surface of the bed will be greater than the distance of the top edge of the intermediate portion of the trang and the surface of the base. The purpose of providing the trangs with different depths is to permit an abnormal quantity of glass to be initially fed upon the base, so as to serve as an anchor for the remaining portion which is to form the sheet proper, and thereby prevent buckling or any inequality in the finished product.

In order that the roller 4 may be conveniently rotated as it passes over the bed, I have provided approximately parallel racks 14 and 15, which are carried by the bed, so that the teeth of the racks mesh with the teeth of the gear-wheels 16 and 17 at the respective ends of the roller 4. These racks are also formed of varying depths to conform to the variations in the trangs heretofore described. When the machine is started, one end of the bed is adjacent to the feed-roller, or at least the feed-roller is superimposed above the edge of the trangs, which governs the relative thickness of the glass sheet. The regulating devices 7 and 7$^a$ may be controlled to move the roller 3 an abnormal distance apart from the roller 4 to permit an abnormal quantity of glass to be fed from the source of supply 18 between the rollers onto the base 1, so that a relatively thick portion will be distributed, as at 19. It will be observed that the axis of the roller 4 is in a plane below the plane of the axis of the roller 3, so that the roller 4 will act as a presser-roller, as well as one of the feed-rollers, the roller 3 being merely an idler actuated by frictional contact with the glass as it passes between both rollers on its way to the bed. As the roller 4 reaches the end of the relatively deep portion of each trang the supply of glass will be restricted, so that only a sufficient quantity will be fed to permit the roller 4 to evenly distribute a layer of glass of uniform thickness upon the base. The relatively thick portion of the glass, as at 19, will constitute the anchor, so that any liability of the portion being formed into the plate becoming buckled or otherwise deteriorating will be materially lessened, if not wholly prevented. Inasmuch as the distributing-roller is resiliently supported in the frame 2, the even distribution of the glass over the surface of the bed will be easily accomplished, and it will be apparent that but little practice will be required for the operator to be able to regulate the governing devices 7 and 7$^a$ so that the proper amount of glass will be distributed between the rollers 3 and 4 to exactly fill the space between the surface of the bed and the top edge of the trangs 12 and 13. Any suitable mechanism can be used or any means employed for moving the frame and the parts carried thereby and the base relative to each other.

Having thus described the invention, what I claim as new, and desire to secure by Letters Patent, is—

1. In a machine for forming sheet-glass, a feed mechanism comprising two rollers, one of which is mounted in a relatively fixed bearing and the other in a movable bearing having a guide approximately concentric with the axis of the first-named roller; substantially as described.

2. In a machine for forming sheet-glass, a feed mechanism comprising two rollers, one of which is movable in a guide approximately concentric with the axis of the other roller, and means for adjusting the other roller toward and away from the first-named movable roller; substantially as described.

3. In a machine for forming sheet-glass, a feed mechanism comprising two rollers, one of which is an adjustable roller mounted in relatively fixed bearings, and the other a movable roller in a plane concentric to the axis of the first-named roller; substantially as described.

4. In a machine for forming sheet-glass, a feed mechanism comprising a frame, a longitudinally-adjustable roller carried in the frame, and a second roller movable in arcuate guides across the path of movement of the first-named roller; substantially as described.

5. In a machine for forming sheet-glass, the combination with a bed having trangs of varying depths, a frame superimposed above said base, a resiliently-mounted feed and presser roller carried by the frame and movable over the upper edges of the trangs, and an adjustable coöperating roller carried by the frame to assist the first-named roller in feeding the glass upon the bed; substantially as described.

In testimony whereof I hereunto affix my signature, in the presence of two witnesses, this 5th day of February, 1904.

ROBERT A. B. WALSH.

Witnesses:
  B. F. FUNK,
  GEORGE BAKEWELL.